United States Patent [19]
Moberg

[11] Patent Number: 5,163,062
[45] Date of Patent: Nov. 10, 1992

[54] METHOD OF FREQUENCY SHIFTING USING A CHROMIUM DOPED LASER TRANSMITTER

[75] Inventor: Victor L. Moberg, San Diego, Calif.

[73] Assignee: The United States of America as represented by the Secretary of the Navy, Washington, D.C.

[21] Appl. No.: 782,008

[22] Filed: Oct. 16, 1991

[51] Int. Cl.$^5$ .............................................. H01S 3/30
[52] U.S. Cl. ....................................... 372/29; 372/3; 372/20; 372/34; 372/55; 372/90; 372/98; 372/108; 359/334
[58] Field of Search ................... 372/3, 20, 21, 22, 29, 372/32, 34, 90, 108, 109, 55, 60, 40, 98; 359/333, 334, 340, 342

[56] References Cited

U.S. PATENT DOCUMENTS

| | | | |
|---|---|---|---|
| 3,611,231 | 10/1971 | Burke | 372/10 X |
| 3,970,390 | 7/1976 | Heflinger et al. | 372/32 X |
| 4,048,516 | 9/1977 | Ammann | 372/3 |
| 4,144,464 | 3/1979 | Loree et al. | 359/334 X |
| 4,280,109 | 7/1981 | Stappaerts | 359/334 X |
| 4,677,632 | 6/1987 | Lisco et al. | 372/38 |
| 4,689,659 | 8/1987 | Watanabe | 372/34 |
| 4,809,291 | 2/1989 | Byer et al. | 372/75 |
| 4,987,376 | 1/1991 | Hughes | 330/4.3 |
| 5,062,112 | 10/1991 | Buchman et al. | 372/3 |
| 5,088,096 | 2/1992 | Pocholle et al. | 372/3 |

OTHER PUBLICATIONS

Minck et al., "Laser-Stimulated Raman Effect . . . " Appl. Phys. Lett. vol. 3 No. 10 Nov. 1963 pp. 181–184.
Mack et al., "Transient Stimulated Rotational . . . " Appl. Phys. Lett. vol. 16 No. 5 Mar. 1970 pp. 209–211.
Duardo et al., "Some New Aspects in Stimulated Raman . . . " IEEE Jour. of Quant. Elect. vol. QE-4 No. 6 1968 pp. 397–403.
McClung et al., "R$_2$ Line Optical Maser Action in Ruby" J. of Appl. Phys. vol. 33, No. 10 Oct. 1962 pp. 3139–3140.
Hubbard et al., "Ruby Laser Action at the R$_2$ Wavelength" Appl. Optics, vol. 3, No. 12 Dec. 1964 pp. 1499–1500.
Abella et al., "Thermal Tuning of Ruby Optical Maser" J. of Appl. Phys., vol. 32 1961 pp. 1177–1178.
Wittke, "Effects of Elevated Temperatures . . . " J. of Appl. Phys., vol. 33, No. 7 1962, pp. 2333–2335.
Carlsten et al., "Efficient Stimulated Raman . . . " Optics Lett. vol. 9, No. 8, 1984 pp. 353–355.
Luches et al., "Improved Conversion Efficiency . . . " Appl. Phys. B., vol. 47 1988 pp. 101–105.

*Primary Examiner*—Brian Healy
*Attorney, Agent, or Firm*—Harvey Fendelman; Thomas Glenn Keough

[57] ABSTRACT

A chromium doped solid-state high peak-power laser transmitter emits at a 4861.342 or 4340.5 Angstrom Fraunhofer line, lines of peak blue-seawater transmission and minimum solar radiation. A pink ruby gain medium doped with approximately 0.05% chromium ion is temperature tuned to an R2 line at 6924.51 Angstrom wavelength and an R1 line is dispersively suppressed in a laser oscillator cavity also tuned to 6924.51 Angstrom. The oscillator is Q-switched and the amplified high peaked-power 6924.51 Angstrom output is hydrogen Raman shifted to the first-Stokes at 9722.684 Angstrom which is frequency doubled to produce a high peak-power output at 4861.342 Angstrom hydrogen-beta Fraunhofer line. Optionally, a temperature tuned R2 line at 6927.00 Angstrom wavelength from the pink ruby gain medium doped with approximately 0.05% chromium ion is Raman shifted 2916 cm$^{-1}$ in methane to the first-Stokes at 8681.0 Angstrom. Next, the first-Stokes at 8681.0 Angstrom is frequency doubled to the 4340.5 Angstrom hydrogen Fraunhofer line.

8 Claims, 3 Drawing Sheets

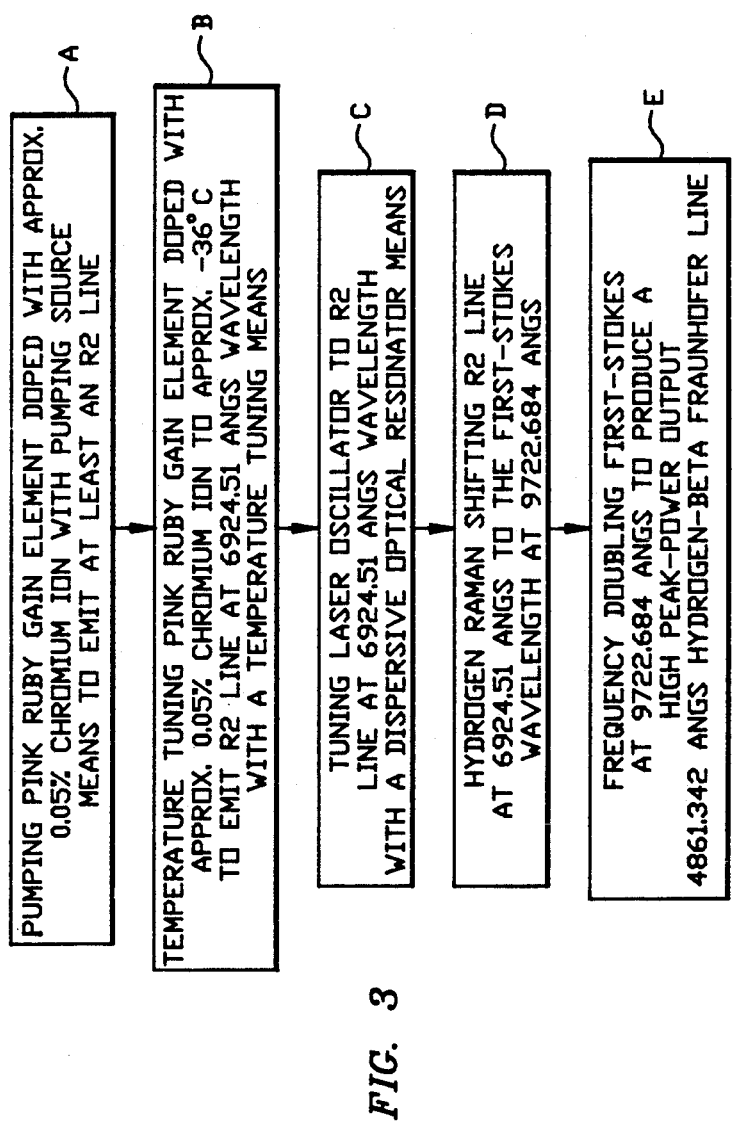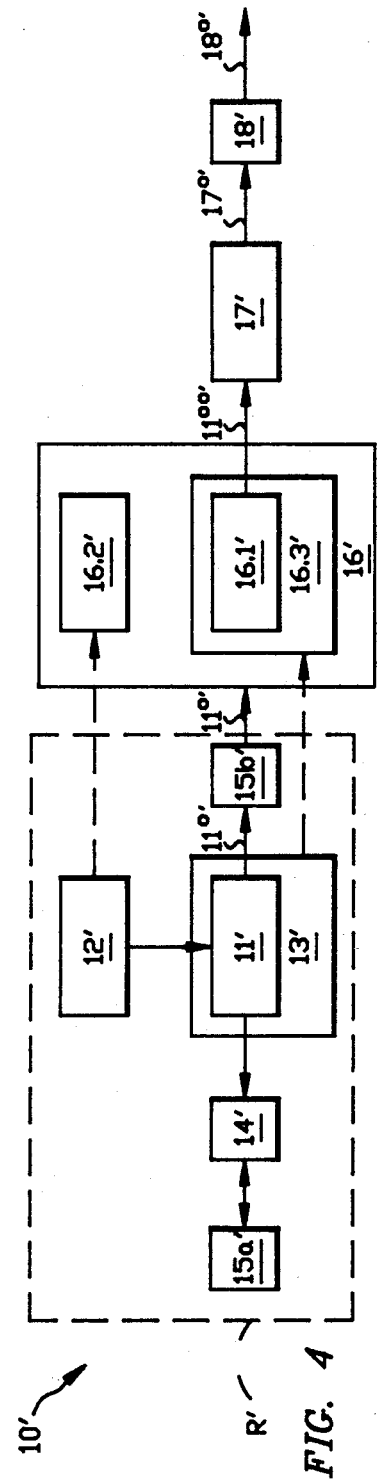

METHOD OF FREQUENCY SHIFTING USING A CHROMIUM DOPED LASER TRANSMITTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Existing laser transmitters for optical communication and ranging applications operate at wavelengths already occupied by the high background noise of the solar spectrum, making reception difficult. For undersea and sea surface penetrating applications, existing systems use dye lasers with material lifetime problems and expensive secondary optical pumping lasers, or xenon chloride excimer lasers with toxic, corrosive gases and 1300 degrees C. lead vapor Raman cells, or solid-state neodymium based lasers at wavelengths outside the peak seawater transmission band, or low peak power, 1500 degrees C. copper vapor lasers. The excimer/lead Raman system also requires wavelength control to milli-Angstrom tolerances and must even compensate for doppler shift due to relative platform motion to be detected by the associated atomic resonance receivers.

Thus, a need currently exists in the state of the art for an improvement in laser communication and ranging systems using a comparatively simple, solid-state high peak-power laser transmitter operating at a select wavelength of minimum solar background radiation and maximum blue-seawater transmission.

SUMMARY OF THE INVENTION

A laser transmitter is centered on the low water attenuation and low background noise Fraunhofer line at 4861.342 Angstrom or optionally 4340.5 Angstrom, which are wavelengths of minimum solar radiation and high blue-ocean transmission. In the 4861.342 Angstrom transmitter an appropriate apparatus and method provides for the temperature tuning of a pink ruby gain medium doped with approximately 0.05% chromium ion to an R2 line wavelength of 6924.51 Angstrom and dispersively suppressing the R1 line. The 6924.51 Angstrom emission is Q-switched and amplified and Raman down-shifted 4155 cm$^{-1}$ in hydrogen to the first Stokes at 9722.684 Angstrom. Next, the first Stokes at 9722.684 Angstrom is frequency doubled to the 4861.342 Angstrom hydrogen-beta Fraunhofer line. Optionally, a temperature tuned R2 line at 6927.00 Angstrom wavelength from the pink ruby gain medium doped with approximately 0.05% chromium ion is Q-switched and amplified and Raman down-shifted 2916 cm$^{-1}$ in methane to the first-Stokes at 8681.0 Angstrom. Next, the first-Stokes at 8681.0 Angstrom is frequency doubled to the 4340.5 Angstrom hydrogen Fraunhofer line.

An object of the invention is to provide for improved optical communications and ranging systems operating in sunlight by using wavelengths at which solar background illumination is minimized.

Another object is to provide an apparatus and method for improved optical communications and ranging relying on the hydrogen-beta Fraunhofer line at 4861.342 Angstroms, a solar hydrogen absorption line exhibiting at its cusp less than 15 percent the intensity of the average blue-green solar background and closely corresponding with the peak transmission wavelength of seawater, making the line particularly useful for undersea or sea-surface penetrating applications.

Another object is to provide an apparatus and method for improved optical communications and ranging relying on the hydrogen Fraunhofer line at 4340.5 Angstrom which is a high transmission wavelength of blue-ocean seawater, making this line particularly useful for undersea or sea-surface penetrating applications.

Yet another object is to provide an apparatus and method for improved optical communications and ranging systems relying upon a moderately cooled solid-state laser, a room temperature Raman convertor and a frequency doubler.

Still another object is to provide an apparatus and method for improved optical communications and ranging that avoids the critical milli-Angstrom wavelength control and exotic atomic resonance receivers heretofore relied upon for the rejection of optical noise by operating in the multi-Angstrom broad Fraunhofer line regions of minimum solar noise.

Yet another object of the invention is to provide an apparatus and method for improved optical communications and ranging systems which is based on existing off-the-shelf technology for creating 4861.342 and 4340.5 Angstrom Fraunhofer line transmissions.

These and other objects of the invention will become more readily apparent from the ensuing specification and claims when taken in conjunction with the appended drawings.

BRIEF DESCRIPTION OF THE DRAWINGS

FIG. 3 sets forth the process for the generation of 4861.342 Angstrom hydrogen-beta Fraunhofer line radiation.

FIG. 4 shows a block diagram representation of the principal constituents of an apparatus of this inventive concept for transmission on the 4340.5 Angstrom hydrogen Fraunhofer line.

DESCRIPTION OF THE PREFERRED EMBODIMENT

Figure 1:
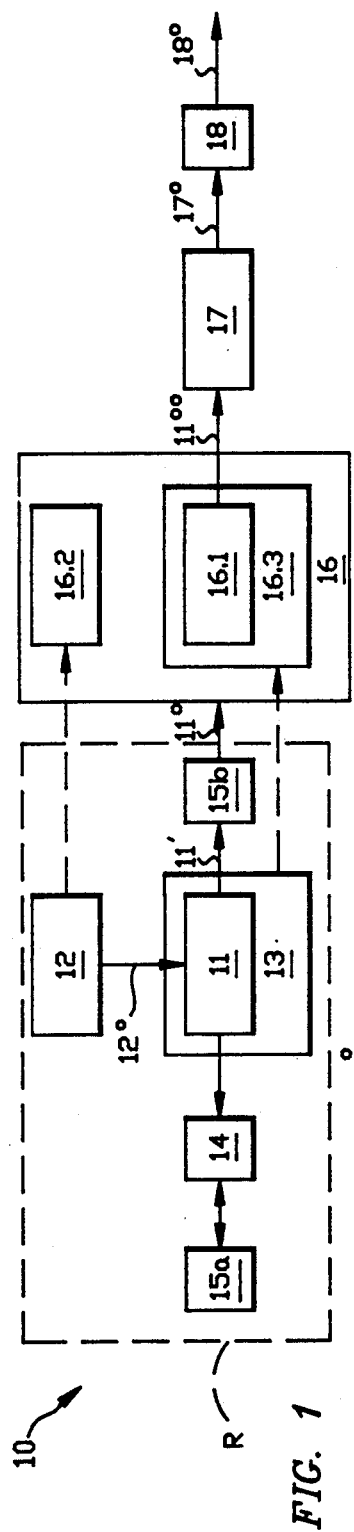
FIG. 1 shows a block diagram representation of the principal constituents of an apparatus of this inventive concept for transmission on the 4861.342 Angstrom hydrogen-beta Fraunhofer line.

Referring now to FIG. 1 of the drawings, a solid state laser transmitter 10 is capable of transmitting on a hydrogen-beta Fraunhofer line at 4861.342 Angstrom or a hydrogen Fraunhofer line at 4340.5 Angstrom when appropriately tailored in accordance with this inventive concept. Transmitters operating at these wavelengths are of particular interest because the daytime background radiation is reduced to less than 15 percent or 18 percent, respectively, of the average blue-green background by a solar hydrogen absorption line. A Fraunhofer line transmitter thus has a daytime signal-to-noise ratio that is about six times higher than an equivalent non-Fraunhofer line laser, an important factor for lidar and communications applications. The 4861.342 Angstrom wavelength and 4340.5 Angstrom wavelength are also important in undersea or sea-surface penetrating applications because they closely correspond with the wavelength of minimum optical attenuation in blue-ocean seawater.

To achieve 4861.342 Angstrom transmission, resonant oscillator R emits at a controlled ruby R2 line wavelength of 6924.51 Angstrom. This wavelength is Raman down-shifted in hydrogen to the infrared and then frequency doubled to produce the desired 4861.342 Angstrom output. To achieve 4340.5 Angstrom transmission, a controlled 6927.00 Angstrom ruby R2 line is Raman frequency down-shifted in methane and frequency doubled to the 4340.5 Angstrom output. Although tens of Joules could be produced in the form of pulses hundreds of microseconds long (possibly useful in some limited communications and imaging applications), generation of lower energy pulses with higher peak-powers by Q-switched systems is selectable.

Resonant oscillator R includes an unclad or sapphire clad pink ruby gain medium or element 11 doped with approximately 0.05% chromium ion, which, typically, exhibits a few tenths of a percent overall electrical to optical conversion efficiency when flashlamp pumped. The pink ruby gain element has been shown to have advantages over the more efficient four-level Nd:YAG system in being able to store approximately 30 times the energy per cubic centimeter and having up to a 90 percent quantum yield, but disadvantages in requiring higher pump thresholds and more efficient cooling for a given repetition rate. Ruby is similar to neodymium doped glass in laser characteristics and applications, but has not yet enjoyed a sustained research effort to improve its average power levels. Conceivably, some of the same techniques which have pushed Neodymium doped glass lasers to the 1000 watt level could be applied to ruby, which actually has a better thermal conductivity.

Ruby lasers have been commercially available with multimode long-pulse (hundreds of microseconds) energy levels in the low hundreds of Joules since the 1960's. Q-switched output is typically 15 percent of the long-pulse energy. Commercial Q-switched systems have been available with up to 20 Joules $TEM_{00}$ output in 25 nanosecond pulse widths at low pulse rates. Adding a Q-switch, temperature tuning, and R2 line selection to a commercially available 15 Joule long-pulse ruby system (for example an Advanced Laser Systems Inc. Model 604) would provide multi-Joule $TEM_{00}$ pulses of 10 to 20 nanoseconds duration at about 5 pps rate. Raman shifting to the first-Stokes with 40% conversion efficiency and frequency doubling with 60% conversion efficiency would result in approximately 500 mJ pulses on the desired Fraunhofer line wavelength. Considerably lower (by a factor of 10 to 1000) pulse energies are required for most undersea communications and ranging applications at these wavelengths. Holding average output power constant, lower pulse energies would yield correspondingly higher transmission rates from the same system. The capabilities provided for undersea communications and ranging in accordance with this inventive concept are significant.

Ruby gain element 11 doped with approximately 0.05% chromium ion generates at least a chromium R2 line fluorescence. A typical such ruby gain element is available from General Ruby and Sapphire Corp. of New Port Richey, Fla., as a Series 10R Czochralski laser rod. Alternatively, a ruby gain element complete with R2 line resonator cavity and pumping source is available from R-K Manufacturing Co. of Hollywood, Fla., as a custom version of the model 6000R-1 laser.

Gain element 11 converts broadband non-coherent optical pump radiation 12° emitted from a pumping radiation source 12 into narrow-band fluorescent emissions 11' which include the R2 line wavelength and amplifies such emissions propagating in laser resonator R through the process of stimulated emission Gain element 11 is shaped to permit uniform thermal regulation to within, for ruby, ±1.4 degrees C. of the set point by an active cooling/temperature tuning system 13. The uniform thermal regulation is aided in part to the use of slab, plate, thin rod or deeply grooved or hollow rod geometry of gain element 11 of resonator R. Divergence of beam 11° is minimized by suitable curvature of output faces of gain element 11 to compensate for thermal effects at the operating temperature.

Pumping radiation source 12, either continuous or pulsed, provides a sufficient emission 12° in the useful laser gain medium pump absorption bands, 3600 Angstrom to 4500 Angstrom and 5100 Angstrom to 6000 Angstrom for ruby, to initiate the desired lasing at the R2 line at the operating temperature. Diode pumping is theoretically possible with the recently developed orange, green, and blue LEDs and laser diodes, but not yet practical due to efficiency and lifetime limitations of these devices. Until visible emission diode technology matures, other more conventional sources, such as flash and continuous arc lamps, may be selected providing that these sources have the appropriate emissions. Xenon Corp. of Woburn, Mass., provides laser pump flash lamps models N-186 N-187 and N-189 suitable for ruby lasers. Alternatively, a flash lamp pumping source is available from R-K Manufacturing Co. of Hollywood, Fla., integrated into an R2 line resonator cavity complete with ruby gain element, as a custom version of the model 6000R-1 laser. Irrespective what particular pumping sources are selected, care must be taken that the chosen optical pump source provides the proper pumping wavelengths that the gain medium 11 of laser resonator R converts to the appropriate laser emission 11°.

Thermal loading and pump-induced optical damage or degradation of the gain medium or element 11 are minimized by appropriate optical filtration, not shown to avoid belaboring the obvious, of pump light 12° at pumping radiation source 12 to remove wavelengths outside the useful excitation bands. When pulsed pumping of the pulse source is desirable, an appropriate timing of a Q-switch 14 in synchronization with the pulsed pumping is preferred to provide maximum gain at the moment of Q-switch opening. The same optical source 12 may be used to pump both the laser oscillator gain element 11 and an amplifier gain media 16, to be described below, note the dotted line connecting these elements in FIG. 1, although a combination of separate, closely synchronized pulse or continuous sources may be chosen to pump these components in some situations. Separate pump sources and cavities will generally be preferred for high energy applications.

A temperature tuning means 13 is operatively associated with gain element 11 of laser resonator R and employs an active feedback controlled cooling system for maintaining the R2 line fluorescence peak 11' of the gain medium at the desired wavelength by thermal regulation of gain element 11. Such a system is provided by FTS Systems, Inc. of Stone Ridge, N.Y., as the Series RC-211-ULT recirculating cooler, capable of +/−0.1 degree C. temperature control over a range from −80 degrees C. to +40 degrees C.

The desired oscillator wavelength 11°, i.e. emission wavelength of resonator R, is dependent upon the transmitter wavelength 18° and Raman conversion means 17, to be described below, employed and is determined by the Equation (1) for the wavelength in Angstroms:

$$\frac{1 \times 10^8}{v + (n \times N \times S)} \quad (1)$$

where $v$ is the inverse centimeter wavenumber expression for twice the transmitter wavelength (10285.23 cm$^{-1}$ for twice 4861.342 Angstroms), n is the index of refraction of air which equals 1.0002926, N is the integer specifying the Raman shift Stokes number required, and S is the Raman shift in inverse centimeters of the Raman medium. The oscillator wavelength must fall within the temperature tuning range of the laser gain medium, and the Stokes number should be kept low (three or less) for maximum conversion efficiency. For a 4861.342 Angstrom transmitter embodiment of this inventive concept using a natural hydrogen Raman shift (4155 inverse centimeters) to the first-Stokes, the required wavelength is:

$$\frac{1 \times 10^8}{10285.23 + (1.0002926 \times 1 \times 4155)} = 6924.51 \text{Å} \quad (2)$$

Figure 2:
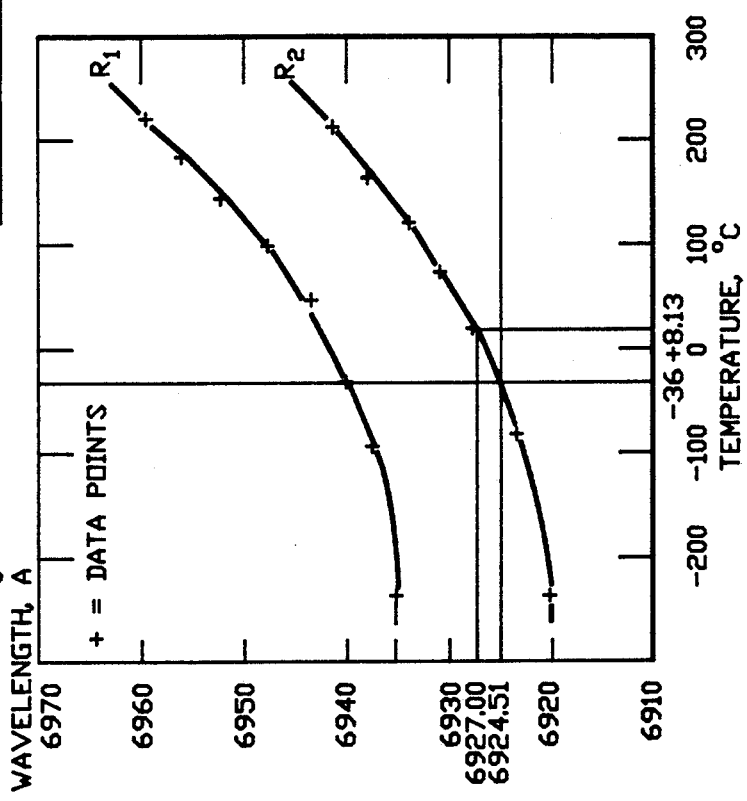
FIG. 2 shows the wavelengths of the R1 and R2 fluorescent lines of ruby as a function of temperature.

Considering the 4861.342 Angstrom transmitter embodiment of this inventive concept, the thermal regulating system 13 thusly temperature shifts the R2 wavelength from the room temperature value, 6929 Angstrom for ruby at 25 degrees C., to the desired 6924.51 Angstrom for ruby at approximately −36 degrees C.(±1.4 degrees C.) and maintains it there despite thermal loading from optical pump 12. Looking to FIG. 2, which shows the wavelengths of the R1 and R2 fluorescent lines of an appropriately pumped ruby gain element as a function of temperature changes, the temperature of the ruby gain element must be maintained by thermal regulating system 13 to within ±1.4 degrees C. of approximately −36 degrees C. to assure the desired 6924.51 Angstrom R2 line emission.

This precise operating temperature is dependent upon the gain medium temperature/wavelength coefficient. Heat is removed from ruby gain element 11 and the temperature maintained by such means as contact with a thermally controlled liquid or gaseous coolant or by conduction through a coldfinger or heat-pipe to a heat pump. A Fluorinert ® FC-84 liquid coolant based system is available from FTS Systems Inc. of Stone Ridge, N.Y., as the Series RC-211-ULT recirculating cooler, capable of +/−0.1 degree C. temperature control over a range from −80 degrees C. to +40 degrees C. Amplifier gain media 16, mentioned above and elaborated on below, optionally, may share thermal regulating system 13 of laser oscillator 11 if both gain media have the same temperature/wavelength coefficient, note the dotted line connecting these elements in FIG. 1. Otherwise, power amplifier 16 and laser oscillator 11 may be separately temperature tuned to assure the same R2 line wavelength.

A Q-switch 14 functions as an optical switching means to spoil resonator Q during buildup of gain medium population inversion and to quickly permit high resonator Q at the desired time of laser emission of the R2 line. The Q-switch permits the gain medium to store a maximum of pump energy before releasing it in a very brief burst with very high peak power. The Q-switch may function as the modulating element for the high peak-power laser ranging and digital communication system when such is the intended use of the system. Q-switches typically employ saturable absorber, electro-optic, acousto-optic, or mechanically rotating optical means. As mentioned above, for pulsed pump sources, Q-switch 14 and pumping source 12 are synchronized to provide maximum oscillator peak power output. Typical Q-switches which could be selected would be the Cleveland Crystals, Inc. of Cleveland, Ohio, Series QX1020 or QX1630 Pockels cells. Alternatively, a Q-switch is provided by R-K Manufacturing Co. of Hollywood, Fla., as an option for the model 6000R-1 ruby laser, a custom version of which lases on the R2 line.

Resonator R also includes a totally reflecting element 15a which may include a mirror, and a partially reflecting element 15b, which may include a partially reflective mirror, appropriately spaced apart to define a required optical resonator laser cavity. The optical resonator cavity is selected to provide a means of narrow-line laser wavelength selection and includes appropriate dispersive elements to suppress the dominant R1 emission line (6939.5 Angstrom at −36 degrees C. for a ruby gain element), in preference for the R2 line emission of 6924.51 Angstrom at the operating temperature. The optical resonator permits the buildup of oscillations at the R2 line, which are amplified during each pass through the gain medium. Typical examples of such components could be the Spindler & Hoyer, Inc. of Milford, Mass., part number 336690 quartz dispersion prism and the Melles Griot, Inc. of Irvine, Calif., product number 08MLQ001/322 totally (99.5%) reflecting mirror and product number 08COB007 partially (70%) reflecting mirror. Alternatively, a R2 line tuned resonator cavity complete with ruby gain element and pumping source is available from R-K Manufacturing Co. of Hollywood, Fla., as a custom version of the model 6000R-1 laser. The resonator is tuned for narrow line operation within ±0.1 Angstrom of the wavelength determined by Equation (1) above by such means as an adjustable etalon, narrow-band mirror, narrow-band filter, prism, diffraction grating, or other suitable narrow-band, low in-band loss dispersive elements associated with the totally reflecting element and a partially reflecting element. Locking of the laser oscillator wavelength to 6924.51 Angstrom may also be facilitated by the injection of seed radiation of 6924.51 Angstrom wavelength into the resonator cavity from an external low power source such as an optical parametric oscillator or diode laser. A laser resonator favoring low or single mode, low divergence output beams is preferred, as high beam quality enhances Raman cell and frequency doubler conversion efficiency.

A power amplifier 16 is included to receive beam 11° to serve as a means of laser beam amplification which is matched in R2 line wavelength and synchronized in timing with the laser resonator R made up of elements 11 through 15. Power amplifier 16 includes a chromium doped optical gain medium 16.1 of substantially the same consistency as that of the gain element 11, an optical pumping means 16.2 which can be a sharing of the pumping emissions of pumping source 12, or a separate pumping means could be provided (not shown in the drawings) if this additional structure is found to be more expedient, and a regulated temperature tuning means 16.3 which could be a sharing of temperature tuning means 13 (see the dotted line in FIG. 1) or a separate such unit if so desired. Power amplifier 16 therefore, typically may be the same as gain medium 11, pump source 12 and temperature control means 13 as described above. The power amplifier 16 increases the 6924.51 Angstrom beam $11^o$ to a high peak power $11^{oo}$ while substantially maintaining the low beam divergence and narrow-line operation of laser resonator R. The optical power amplifier may be omitted for some applications which require less peak-power, provided that Raman converter 17 and frequency doubler 18 thresholds are met.

A hydrogen Raman cell converter 17 receives the amplified 6924.51 Angstrom beam $11^{oo}$ and serves as a means of Raman conversion. This converter utilizes stimulated scattering in a Raman medium such as hydrogen to increase the wavelength, or decrease the wavenumber, of the incoming laser beam $11^{oo}$ to a Raman down-shifted 9722.684 Angstrom first-Stokes wavelength $17^o$. A Raman converter is typically either a single-pass device, a multi-pass device, or a Raman oscillator/amplifier combination of single or multi-pass devices. A typical hydrogen filled Raman converter is available from Photon Interactions of Alexandria, Va. as one Raman material option of the RS-100 series Raman cells.

The Raman medium pressure or concentration, composition, beam focusing optics and path length of hydrogen Raman cell converter 17 are optimized in accordance with techniques freely practiced by one skilled in the art to which this invention pertains for conversion to the desired Stokes shift. For efficient Raman shifting of 6924.51 Angstrom $11^{oo}$ to the first-Stokes wavelength $17^o$ which is 9722.684 Angstrom in natural hydrogen, these parameters are adjusted to minimize the fourwave mixing which leads to competition from higher Stokes shifts. Exemplary techniques for efficient hydrogen Raman conversion to the first Stokes are disclosed by J. L. Carlsten et al., *Optics Letters*, Vol.9, No. 8 (1984) page 353, and A. Luches et al., *Applied Physics B*, Vol. No. 47 (1988) page 101. For a hydrogen Raman converter such as that employed in this inventive concept, a relatively short Raman oscillator operating near threshold power levels with approximately 100 atmospheres pressure of hydrogen with a helium or argon additive, and a long focal length beam reduction optic would tend to promote first-Stokes output exclusively. This low energy 9722.684 Angstrom output would then be filtered to remove vestigial higher Stokes components, and used to seed an approximately 40 atmosphere pressure hydrogen Raman amplifier as the amplifier receives the suitably delayed main portion of the 6924.51 Angstrom laser beam. Optionally, a separate external source of 9722.64 Angstrom radiation, such as an infrared diode laser or optical parametric oscillator, may be employed to provide the Raman amplifier seed radiation.

A transmitter fabricated in accordance with this inventive concept and employing continuous optical pumping from pumping sources 12 will generally have lower peak-power than that obtainable with a high peak-power pulsed pump source. The lower peak-power beam may require lower threshold Raman converters, such as those based on small cross-section waveguide or capillary structures or multi-pass resonator structures. Single mode, low divergence beams are required for high conversion efficiency with these Raman converters.

The 6924.51 Angstrom laser oscillator wavelength is applicable to operation with a natural hydrogen Raman cell at one Stokes shift. Other Raman media have different degrees of shift and could utilize the same or higher Stokes orders to meet the requirements of equation (1) for a wavelength within the temperature and resonator tuning capability of the laser oscillator.

A crystalline non-linear optical element 18 is appropriately disposed to receive Raman shifted 9722.684 Angstrom first-Stokes wavelength $17^o$ and is included to function as an optical frequency doubling means. This crystalline non-linear optical element, or doubler, converts the 9722.684 Angstrom output $17^o$ of Raman converter 17 to the 4861.342 Fraunhofer line wavelength output $18^o$. The doubler has good transmission at both the 9722.684 Angstrom and the 4861.342 Angstrom wavelengths and is able to phase match to the incoming 9722.684 Angstrom beam. A typical doubler which could be included as the crystalline non-linear optical element 18 is Lithium Triborate, $LiB_3O_5$ ("LBO") provided by Quantum Technology, Inc. of Lake Mary Fla.

Operationally, referring to FIG. 3, the 4861.342 Angstrom chromium doped laser transmitter calls for pumping A and temperature tuning B of gain element 11 of laser resonator R (elements 11-12-13-14-15) to emit the R2 line $11^0$ at 6924.51 ±0.1 Angstrom. While temperature tuning B, ruby gain medium 11 is maintained at approximately −36 degrees C. by the temperature tuning means 13. The 6949 Angstrom R1 line temperature shifts to 6939.5 Angstrom, which is suppressed by the appropriate configuration of dispersive resonator elements 15a and 15b in conjunction with gain element 11. The oscillator cavity defined by elements 11, 15a and 15b is dispersively tuned C. to 6924.51 ±0.1 Angstrom to assure that 6924.51 Angstrom $11^o$ is the emission of laser oscillator resonator R. Laser oscillator Q-switch 14 is appropriately triggered so that an output beam $11^o$ at 6924.51 Angstrom is fed to power amplifier 16 which produces a high peak-power 6924.51 Angstrom output $11^{oo}$ for input to hydrogen Raman cell 17. The Raman cell effects a Raman down-shifting D of 4155 cm$^{-1}$ to the 9722.684 Angstrom first-Stokes wavelength $17^o$ that is emitted to a crystalline non-linear optical frequency doubler 18 where the 9722.684 Angstrom $17^o$ is converted by frequency doubling E to 4861.342 Angstrom output $18^o$ which is a high peak-power transmitter output centered on the low-noise Fraunhofer line at 4861.342 Angstrom.

Contemporary optical communication and ranging systems operating in sunlight are improved in performance by utilizing wavelengths at which the solar background illumination is minimized. The invention provides such wavelength transmissions on the hydrogen-beta Fraunhofer line at 4861.342 Angstrom, a solar hydrogen absorption line exhibiting, at its cusp, solar noise less than 15 percent the intensity of the average blue-green solar background. This line also closely corresponds with the peak transmission wavelength of blue-ocean seawater, making it particularly useful for undersea or seasurface penetrating applications. This inventive concept utilizes only a modestly cooled solid-state laser, a room temperature Raman converter and a frequency doubler. It reduces the complexity of contemporary transmitters of this type by not requiring critical milli-Angstrom wavelength control and exotic atomic resonance receivers to reject solar noise as it operates in a multi-Angstrom broad region of minimum solar radiation.

The above mentioned configuration can be modified within the teachings of this inventive concept to accommodate other component architectures. For example, this inventive concept can be modified to transmit at a 4340.5 Angstrom hydrogen Fraunhofer line, see the transmitter 10' in FIG. 4. The Fraunhofer line at 4340.5 Angstrom also is a solar hydrogen absorption line exhibiting at its cusp less than 18 percent of the intensity of average blue solar background. This line is also an excellent transmission wavelength of blue-ocean seawater, making it particularly useful for undersea or seasurface penetrating applications. A high peak-power laser transmitter with output wavelength centered at 4340.5 Angstrom may be required for practical optical communications and ranging systems making use of this hydrogen Fraunhofer line.

As with the embodiment described above, this arrangement utilizes a series of interrelated components and processes, each individually common in the art but novel in their combination to produce a high peak-powered laser transmitter system emitting at the center of the 4340.5 Angstrom hydrogen Fraunhofer line. A 4340.5 Angstrom hydrogen Fraunhofer line transmitter 10' has an optical resonator R' containing laser gain element or medium 11' consisting of unclad or sapphire clad pink ruby, chromium ion doped to approximately 0.05 percent. The ruby gain element is appropriately pumped by a pumping source 12' to emit at least an R2 line at 6927.00 Angstrom with the ruby gain element held at a temperature of approximately 8.13 degrees C., which is established by a temperature stabilizing means 13'.

The ruby gain element is shaped appropriately to permit uniform thermal regulation to within ±1.4 degrees C. of approximately +8.13 degrees C. by active cooling/temperature tuning system 13'. This is facilitated through use of slab, plate, or deeply grooved or hollow rod structures. Divergence of beam $11^{o'}$ is minimized by suitable curvature of output faces of gain element 11' to compensate for thermal effects at the operating temperature.

An optical pumping source 12', either continuous or pulsed, with sufficient emission in the proper pumping bands of the ruby gain medium stimulates the medium to emit the R2 line at 6927.00 Angstrom at approximately +8.13 degrees C. Thermal loading and ultraviolet damage to the ruby gain element are minimized by optical filtration of the pump light from source 12' to remove wavelengths outside the useful ruby absorption bands. Pulsed pump source timing is synchronized with the firing of a Q-switch 14' to provide maximum gain at the moment of Q-switch opening.

An active cooling/temperature tuning system 13' effects a temperature tuning and the maintaining of the peak of the ruby R2 gain curve within ±0.1 Angstrom at 6927.00 Angstrom by thermal regulation of the ruby gain medium. Because of the temperature/wavelength coefficient of the ruby, the ruby temperature is maintained to within ±1.4 degrees C. of approximately +8.13 degrees C.

An optical resonator laser cavity of resonator R' is created to include a totally reflective element 15a ' which may include a mirror and a partially reflective element 15b ' which may include a partially reflective mirror with wavelength selective features to suppress the dominant ruby gain element R1 emission line of 6941 Angstrom (at +8.13 degrees C.) in preference for the R2 emission line of 6927.00 Angstrom. The resonator is tuned for single wavelength operation at 6927.00 Angstrom by an adjustable etalon, filter, prism, grating, or other suitable wavelength selective element which may be included in the totally reflective element and the partially reflective element. Wavelength locking may also be facilitated by the injection of seed radiation of 6927.00 Angstrom wavelength into the resonator cavity from an external low power source such as an optical parametric oscillator or diode laser.

Optical switch 14' functions to spoil resonator Q during buildup of population inversion and quickly permit high resonator Q at the desired time of laser emission similarly to the first described embodiment and may be of a passive chemical, electro-optic, acousto-optic, or mechanical nature. The Q-switch is synchronized with pulsed pumping source 12' to provide maximum peak power output.

A ruby power amplifier 16', if used, is matched in wavelength and synchronized in timing with the resonator R' and consists of elements 16.1', 16.2' and 16.3' which are 5 substantially the same as elements 11', 12' and 13', respectively. Power amplifier 16' provides increased peak power while maintaining the low beam divergence and narrow line operation of the lower power laser oscillator R'. The power amplifier would be located between the output $11^{o'}$ of the laser oscillator R' and the input $11^{\infty'}$ of a methane Raman shifter 17' as shown in FIG. 4.

A high pressure first-Stokes methane Raman shifter 17' utilizes methane gas pressurized to approximately 60 atmospheres. It is either a single-pass device, a cascade of single-pass devices, or a device utilizing an optical resonator to reduce physical length. A typical methane filled Raman converter is available from Photon Interactions of Alexandria, Va. as one Raman material option of the RS-100 series Raman cells. Efficient wavelength conversion is promoted by the use of co-propagating seed radiation of the desired 8681 Angstrom Raman wavelength, either from an external source such as an optical parametric oscillator or infrared diode laser, or more conveniently from an integral low power Raman oscillator receiving a fraction of the input radiation. The pressure, gas mixture, beam focusing, and path length are optimized therein for conversion to the first-Stokes shift. Window materials are selected for mechanical strength, high optical damage threshold, and good transmission at the appropriate input or output wavelength. An optical isolator, such as the Faraday rotators provided by Optics for Research of Caldwell, N.Y., is recommended in the beam path before the methane Raman cell to prevent damage to the components of the laser amplifier or oscillator by radiation back-scattering from the methane Raman medium.

The methane Raman shifter 17' Raman down-shifts the 6927.00 Angstrom to the first-Stokes wavelength of 8681.0 Angstrom $17^{o'}$ which is applied to frequency doubler 18' utilizing a non-linear optic element.

Frequency doubler 18' is chosen for low doubling threshold, high damage threshold, and good transmission at both the fundamental and second harmonic wavelengths. The frequency doubler frequency doubles the Raman shifted 8681.0 Angstrom wavelength $17^{o'}$ to the desired hydrogen Fraunhofer line at 4340.5 Angstrom output $18^{o'}$. A typical doubler which could be included as the crystalline non-linear optical element 18' is Lithium Triborate, $LiB_3O_5$ ("LBO") provided by Quantum Technology, Inc. of Lake Mary Fla.

Figure 5:
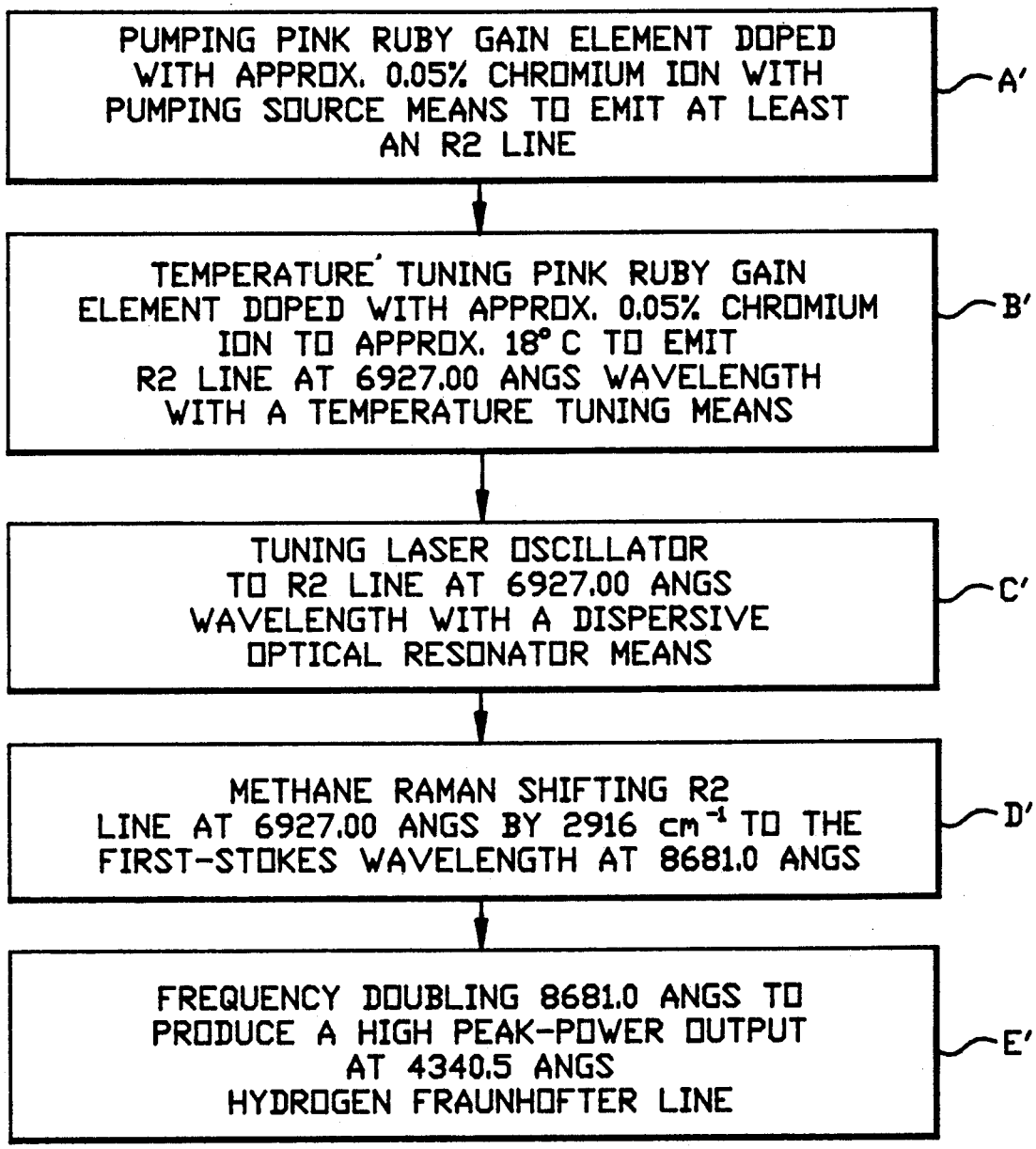
FIG. 5 sets forth the process for the generation of 4340.5 Angstrom hydrogen Fraunhofer line radiation.

Referring to FIG. 5, in operation this embodiment has a pumping A' of a gain element 11' and a temperature tuning B' to an R2 line 6927.00 Angstrom wavelength from gain element 11' and a dispersive optical resonator tuning C' to an R2 line 6927.00 wavelength from laser oscillator R' and a methane Raman shifting D' by 2916 cm$^{-1}$ to first-Stokes at 8681.0 Angstrom wavelength in methane. Next, a frequency doubling E' of the first-Stokes at 8681.0 Angstrom wavelength is effected to provide the desired 4340.5 Angstrom hydrogen Fraunhofer line output.

By operating on a Fraunhofer line, solar background noise can be reduced by approximately 82 percent. The blue wavelength is also excellent for undersea and sea-penetrating applications because of high blue-ocean optical transmission.

Obviously, many modifications and variations of the present invention are possible if the light of the above teachings. It is therefore to be understood that within the scope of the appended claims the invention may be practiced otherwise than specifically described.

I claim:

1. A method of emitting on a 4861.342 Angstrom hydrogen-beta Fraunhofer line of peak blue-seawater transmission and minimum solar radiation comprising:
   pumping a pink ruby gain element doped with approximately 0.05% chromium ion with a pumping source means to emit at least an R2 line;
   temperature tuning said pink ruby gain element doped with approximately 0.05% chromium ion to approximately $-36°$ C. to emit at said R2 line at 6924.51 Angstrom wavelength with a temperature tuning means;
   tuning the optical resonator cavity containing said pink ruby gain element to oscillate at said R2 line at 6924.51 Angstrom wavelength with a dispersive tuning means;
   hydrogen Raman shifting said R2 line at 6924.51 Angstrom to the first-Stokes wavelength at 9722.684 Angstrom; and
   frequency doubling said first-Stokes at 9722.684 Angstrom to produce a high peak-power output at said 4861.342 Angstrom hydrogen-beta Fraunhofer line.

2. A method according to claim 1 further including: dispersively suppressing an R1 line in a laser oscillator cavity also tuned to said R2 line at 6924.51 Angstrom.

3. A method according to claim 2 further including: Q-switching said R2 line at 6924.51 Angstrom prior to said hydrogen Raman shifting.

4. A method according to claim 3 further including: amplifying said R2 line at 6924.51 Angstrom prior to said hydrogen Raman shifting.

5. A method of emitting on a 4340.5 Angstrom hydrogen Fraunhofer line of peak blue-seawater transmission and minimum solar radiation and high blue-ocean transmission comprising:
   pumping a pink ruby gain element doped with approximately 0.05% chromium ion with a pumping source means to emit at least an R2 line;
   temperature tuning said pink ruby gain element doped with approximately 0.05% chromium ion to approximately $+8.13°$ C. to emit at said R2 line at 6927.00 Angstrom wavelength with a temperature tuning means;
   tuning the optical resonator cavity containing said pink ruby gain element to oscillate at said R2 line at 6927.00 Angstrom wavelength with a dispersive tuning means;
   methane Raman shifting said R2 line at 6927.00 Angstrom by 2916 cm$^{-1}$ to the first-Stokes wavelength at 8681.0 Angstrom; and
   frequency doubling said 8681.0 Angstrom to produce a high peak-power output at said 4340.5 Angstrom hydrogen Fraunhofer line.

6. A method according to claim 5 further including: dispersively suppressing an R1 line in a laser oscillator cavity also tuned to said R2 line at 6927.00 Angstrom.

7. A method according to claim 6 further including: Q-switching said R2 line at 6927.00 Angstrom prior to said methane Raman shifting.

8. A method according to claim 7 further including: amplifying said R2 line at 6927.00 Angstrom prior to said methane Raman shifting.

* * * * *